United States Patent
Fan et al.

(10) Patent No.: US 12,275,354 B2
(45) Date of Patent: Apr. 15, 2025

(54) ACCELERATOR AND VEHICLE-MOUNTED RADIATION IMAGING DEVICE

(71) Applicant: Nuctech Company Limited, Beijing (CN)

(72) Inventors: Xuping Fan, Beijing (CN); Quanwei Song, Beijing (CN); Junping Shi, Beijing (CN)

(73) Assignee: Nuctech Company Limited, Beijing (CN)

( * ) Notice: Subject to any disclaimer, the term of this patent is extended or adjusted under 35 U.S.C. 154(b) by 234 days.

(21) Appl. No.: 18/000,106

(22) PCT Filed: May 31, 2021

(86) PCT No.: PCT/CN2021/097200
§ 371 (c)(1),
(2) Date: Nov. 28, 2022

(87) PCT Pub. No.: WO2021/239145
PCT Pub. Date: Dec. 2, 2021

(65) Prior Publication Data
US 2023/0192006 A1 Jun. 22, 2023

(30) Foreign Application Priority Data

May 29, 2020 (CN) .......................... 202010476217.5

(51) Int. Cl.
*B60R 11/00* (2006.01)
*G01V 5/22* (2024.01)

(52) U.S. Cl.
CPC ................ *B60R 11/00* (2013.01); *G01V 5/22* (2024.01)

(58) Field of Classification Search
CPC .................................. B60R 11/00; G01V 5/22
See application file for complete search history.

(56) References Cited

U.S. PATENT DOCUMENTS

| 2004/0258198 A1 | 12/2004 | Carver et al. |
| 2013/0028376 A1 | 1/2013 | Mastronardi et al. |
| 2016/0061989 A1* | 3/2016 | Kang ..................... G01V 5/232 |
| | | 250/393 |

FOREIGN PATENT DOCUMENTS

| CN | 201440131 U | 4/2010 |
| CN | 204086172 U | 1/2015 |

(Continued)

OTHER PUBLICATIONS

"European Application No. 21813030.0, Extended European Search Report dated May 28, 2024", (May 28, 2024), 8 pgs.

(Continued)

*Primary Examiner* — Edwin C Gunberg
*Assistant Examiner* — Richard O Toohey
(74) *Attorney, Agent, or Firm* — Schwegman Lundberg & Woessner, P.A.

(57) ABSTRACT

An accelerator and a vehicle-mounted radiation imaging device are provided, wherein the accelerator includes an accelerator body and a position adjusting apparatus; the position adjusting apparatus includes a rotating apparatus and a lifting apparatus disposed on the rotating apparatus, the rotating apparatus is rotatably disposed on a support platform, the rotating apparatus includes a rotary platform, the lifting apparatus is connected with the rotary platform and is rotatable with the rotary platform, the accelerator body is connected with the lifting apparatus, the rotary platform is rotatable between a first position and a second position, and when the rotary platform is at the second position, a projection of the accelerator body on a surface of the support platform is outside a first edge of the support platform, and a projection of the rotary platform on the surface of the support platform is within the first edge of the support platform.

11 Claims, 7 Drawing Sheets

(56) References Cited

FOREIGN PATENT DOCUMENTS

| CN | 105116462 | A | | 12/2015 | | |
|----|-----------|---|---|---------|---|---|
| CN | 204882895 | U | | 12/2015 | | |
| CN | 204925417 | U | | 12/2015 | | |
| CN | 107991323 | A | | 5/2018 | | |
| CN | 110617013 | A | * | 12/2019 | ............ | E21B 7/021 |

OTHER PUBLICATIONS

"International Application Serial No. PCT/CN2021/097200, International Search Report dated Jul. 16, 2021", (Jul. 16, 2021), 2 pgs.

* cited by examiner

ACCELERATOR AND VEHICLE-MOUNTED RADIATION IMAGING DEVICE

This application is a U.S. National Stage Filing under 35 U.S.C. § 371 from International Application No. PCT/CN2021/097200, filed on May 31, 2021, and published as WO2021/239145 on Dec. 2, 2021, which claims priority to Chinese Patent Application No. 202010476217.5, filed on May 29, 2020; the benefit of priority of each of which is hereby claimed herein, and which applications and publication are hereby incorporated herein by reference in their entireties.

TECHNICAL FIELD

The present disclosure relates to a technical field of radiation detection device, in particular to an accelerator and a vehicle-mounted radiation imaging device.

BACKGROUND

With a development of economic society and a demand for social security, in order to improve an efficiency of security inspection, a radiation imaging device for non-destructive security inspection is required in many places. A vehicle-mounted mobile radiation imaging device is an apparatus commonly used in a container inspection system at present. The vehicle-mounted mobile radiation imaging device is fast and convenient to move, which greatly saves a detection time. An accelerator is often adopted as a radiation source in the vehicle-mounted mobile radiation imaging device.

During operation, the accelerator is desired to be moved from a driving position to a working position, and a height of the working position is not fixed, so a lifting apparatus is desired to be provided to adjust a position of the accelerator. The existing lifting apparatus generally adopts vertical lifting or parallelogram lifting, and no matter which method is used, the device will occupy a length of a vehicle body in a driving state, thus causing an entire vehicle device to be longer and occupy a larger space, which is inconvenient for vehicle movement and detection.

SUMMARY

The objective of the present disclosure is to provide an accelerator, including an accelerator body and a position adjusting apparatus, wherein the position adjusting apparatus includes a rotating apparatus and a lifting apparatus disposed on the rotating apparatus, and the rotating apparatus is rotatably disposed on a support platform; the rotating apparatus includes a rotary platform, the lifting apparatus is connected with the rotary platform, the lifting apparatus is rotatable with the rotary platform, the accelerator body is connected with the lifting apparatus, wherein the rotary platform is rotatable between a first position and a second position, and when the rotary platform is at the second position, a projection of the accelerator body on a surface of the support platform is located outside a first edge of the support platform, and a projection of the rotary platform on the surface of the support platform is located within the first edge of the support platform.

In a solution, the rotating apparatus further includes a rotating member, a rotating mating member and a rotating driving apparatus, and the rotating member is rotatable relative to the rotating mating member under a driving of the rotating driving apparatus.

In a solution, the rotating member is an annular structure, the rotating mating member has an accommodating space, the rotating member is disposed in the accommodating space of the rotating mating member, and the rotating member is rotatable relative to the rotating mating member.

In a solution, the rotating member is an annular structure, the rotating mating member has an axial structure, the rotating member is sleeved on an outside of the axial structure of the rotating mating member, and the rotating member is rotatable relative to the rotating mating member.

In a solution, the lifting apparatus includes a sliding member, a lifting guide rail and a lifting driving apparatus, and the sliding member and the lifting guide rail are slidable relative to each other under a driving of the lifting driving apparatus, wherein one of the sliding member and the lifting guide rail is connected with the rotary platform, and the other one of the sliding member and the lifting guide rail is connected with the accelerator body.

In a solution, one of the lifting guide rail and the sliding member is provided with a bearing, and the other one of the lifting guide rail and the sliding member is provided with a groove for accommodating the bearing.

In a solution, the lifting guide rail is a U-shaped structure in cross section, the lifting guide rail includes a bottom wall, and a first sidewall and a second sidewall connected with two sides of the bottom wall, and the bearing or the groove is disposed on the bottom wall and at least one sidewall.

In a solution, an adjustment mechanism is further disposed between the rotary platform and the lifting apparatus, the adjustment mechanism includes at least three adjustment units, and each adjustment unit is a length retractable apparatus.

In a solution, two ends of at least one adjustment unit are connected with the rotary platform and the lifting apparatus in a hinged mode.

The present disclosure further provides a vehicle-mounted radiation imaging device, including a vehicle and the accelerator in any of the above-mentioned solutions, wherein the vehicle is configured as the support platform.

1: Accelerator body 1; 2: Position adjusting apparatus; 21: Rotating apparatus; 22: Lifting apparatus; 23: Adjustment mechanism; 100: Support platform (vehicle); 101: First edge; 211: Rotating member; 212: Rotary platform; 213: Rotating mating member; 214: Rotating driving apparatus; 221: Sliding member; 222: Lifting guide rail; 223: Lifting driving apparatus; 224: Bearing; 225: Groove.

DETAILED DESCRIPTION OF EMBODIMENTS

In order to enable those skilled in the art to better understand the present disclosure, the present disclosure will be further described in detail below in combination with the accompanying drawings and implementation methods. It should be noted that, in a case of no conflict, embodiments and features in the embodiments in the present disclosure may be arbitrarily combined with each other.

Figure 1:
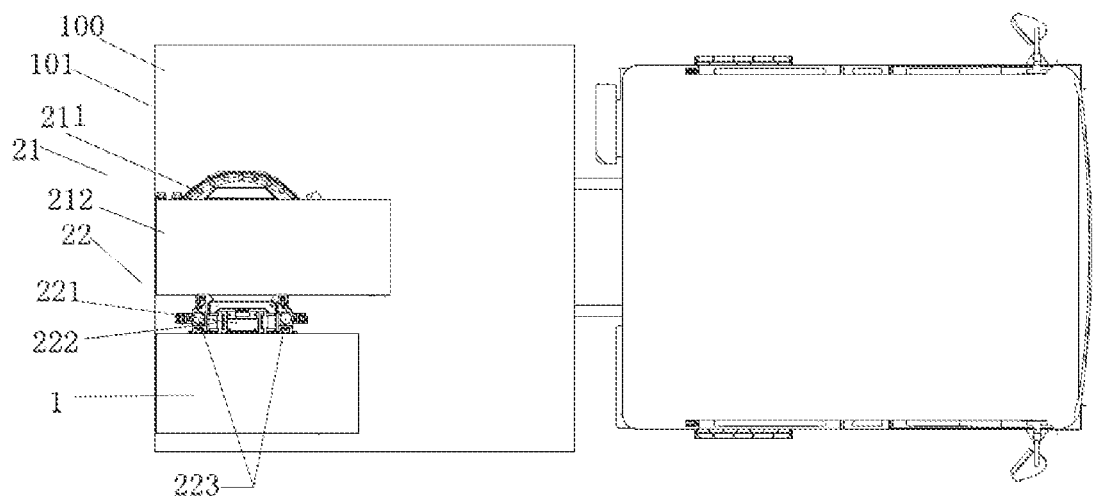
FIG. 1 shows a top view of an accelerator in a non-working state in the present disclosure.
Figure 2:
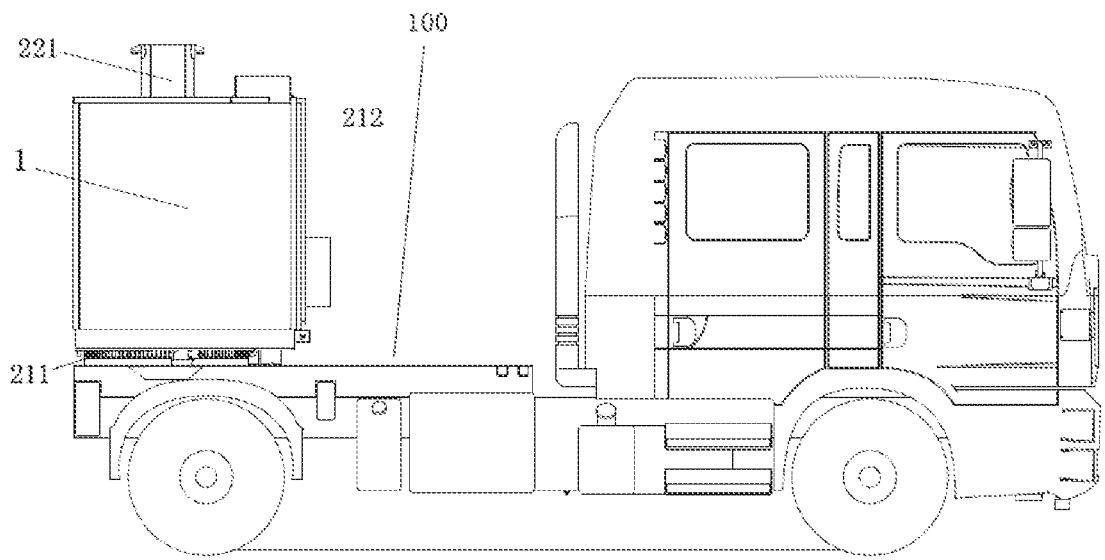
FIG. 2 shows a front view of an accelerator in a non-working state in the present disclosure.
Figure 3:
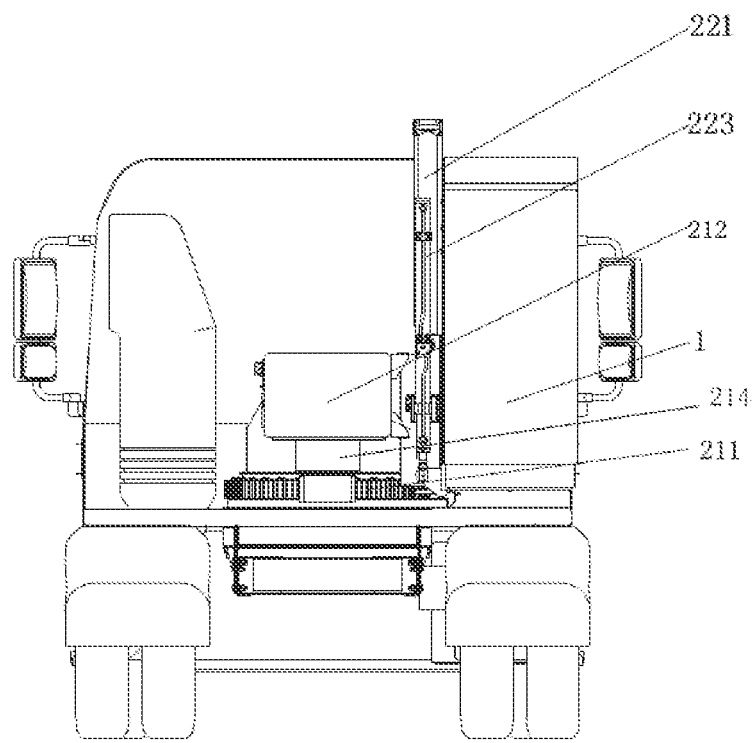
FIG. 3 shows a side view of an accelerator in a non-working state in the present disclosure.

As shown in FIG. 1 to FIG. 3, an accelerator of the present disclosure includes an accelerator body 1 and a position adjusting apparatus 2. The position adjusting apparatus 2 is used to adjust a position of the accelerator body 1. The position adjusting apparatus 2 may be arranged on a support platform 100.

The position adjusting apparatus 2 includes a rotating apparatus 21 and a lifting apparatus 22 arranged on the rotating apparatus 21. The accelerator body 1 is connected with the lifting apparatus 22, and the rotating apparatus 21 is connected with the support platform 100. In a solution, the support platform 100 is a vehicle.

The rotating apparatus 21 includes a rotating member 211 and a rotary platform 212 connected with the rotating member 211. The lifting apparatus 22 is connected with the rotary platform 212, and the lifting apparatus 22 is rotatable with the rotary platform 212. The rotary platform 212 is rotatable between a first position and a second position. Moreover, the support platform has a first edge 101. When the rotary platform 212 is at the second position, a projection of the accelerator body 1 on a surface of the support platform 100 is located outside the first edge 101 of the support platform 100, and a projection of the rotary platform 212 on the surface of the support platform 100 is located within the first edge 101 of the support platform 100. At this point, the accelerator body 1 may move up and down under an action of the lifting apparatus 22, so as to adjust a height of the accelerator body 1. In a solution, when the rotary platform 212 is at the first position, a projection of the accelerator body 1 on the surface of the support platform 100 is at least partially located within the first edge 101 of the support platform 100. Preferably, when the rotary platform 212 is at the first position, the projection of the accelerator body 1 on the surface of the support platform 100 is entirely located within the first edge 101 of the support platform 100. When the support platform 100 is the vehicle, the first edge 101 is a rear edge in a length direction of a vehicle body.

With the solution of the present disclosure, the accelerator body 1 may switch positions inside and outside the support platform 100 through an action of the rotating apparatus 21 and the lifting apparatus 22. During transportation, the accelerator body 1 may be located inside the support platform 100, which is convenient for transportation and reduces a length of the platform. During operation, the accelerator body 1 may be located outside the support platform 100, which is convenient for the accelerator body 1 to adapt to working positions at different heights.

In a solution, when the rotary platform 212 is located at the second position, the projection of the accelerator body 1 on the surface of the support platform 100 is adjacent to an edge of the support platform 100. For example, a distance between the projection of the accelerator body 1 on the surface of the support platform 100 and the edge of the support platform 100 is 5 to 20 cm.

With such a solution, the accelerator body 1 is disposed close to the edge of the support platform 100 when the rotary platform 212 is at the second position, ensuring that a size of the entire device is not too large during operation.

Figure 4:
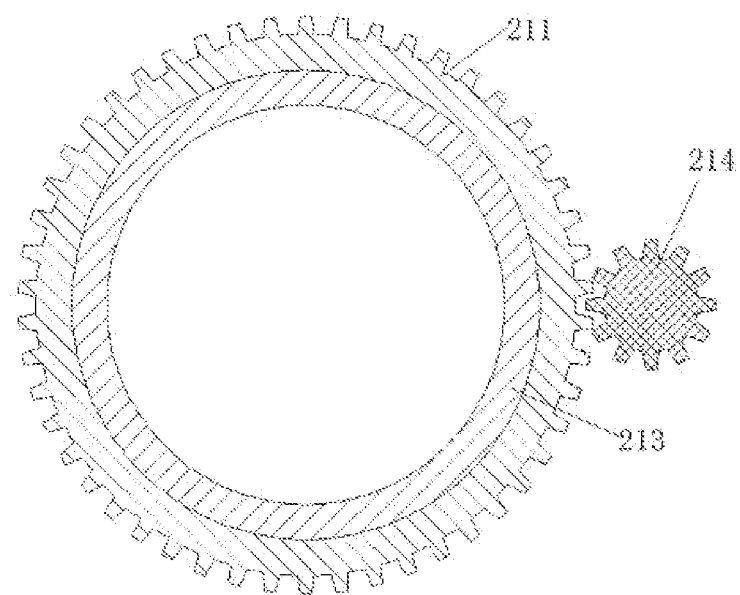
FIG. 4 shows a structural diagram of a rotating apparatus in the present disclosure.
Figure 5:
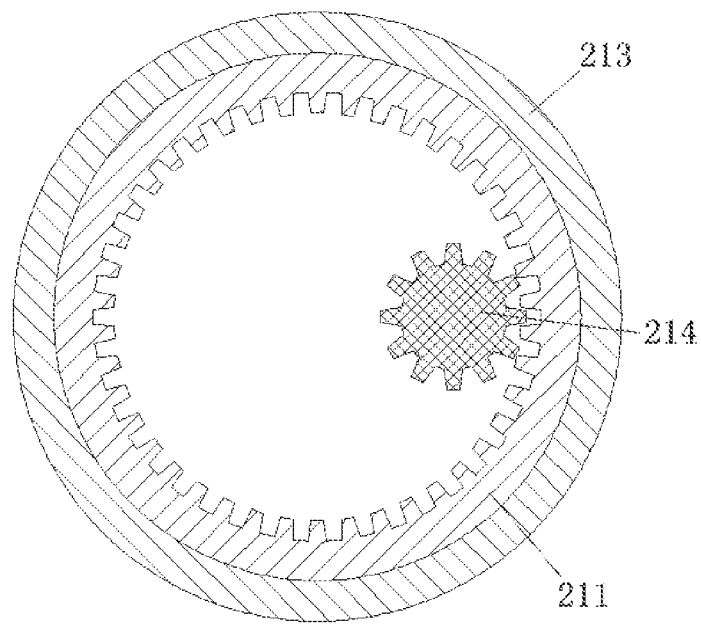
FIG. 5 shows a structural diagram of a rotating apparatus in another solution of the present disclosure.

As shown in FIG. 4 to FIG. 5, in a solution, the rotating apparatus 21 further includes a rotating mating member 213, and the rotating member 211 is rotatable relative to the rotating mating member 213. The rotating mating member 213 is arranged on the support platform 100. In a solution, the rotating apparatus 21 further includes a rotating driving member 214, which is used to drive the rotating member 211 to rotate relative to the rotating mating member 213. The rotating driving member 214 may be a motor or a hydraulic motor, a matched reducer and gear, etc. In a solution, the rotating member 211 and the rotary platform 212 are in an integrated structure.

In a solution, the rotating driving member 214 may be arranged inside or outside the rotary platform 212 (not shown in the figures).

In a solution, as shown in FIG. 4, the rotating member 211 is an annular structure, and the rotating mating member 213 has an accommodating space, so that the rotating member 211 may be disposed in the accommodating space of the rotating mating member 213. An inner surface of the annular structure is provided with teeth for matching with the gear of the rotating driving member 214. An outer surface of the annular structure of the rotating member 211 and an inner surface of the accommodating space of the rotating mating member 213 are both smooth structures, so that the outer surface of the annular structure of the rotating member 211 and the inner surface of the accommodating space of the rotating mating member 213 may rotate and slide relative to each other. In a solution, a rolling member (such as a ball or a rolling cone) is arranged between the outer surface of the annular structure of the rotating member 211 and the inner surface of the accommodating space of the rotating mating member 213. In this way, the rotating member 211 may rotate relative to the outer rotating mating member 213 under a driving of the rotating driving member 214, thereby driving the rotary platform 212 to rotate.

In a solution, as shown in FIG. 5, the rotating member 211 is an annular structure, the rotating mating member 213 has an axial structure, an inner surface of the annular structure of the rotating member 211 and an axial surface of the rotating mating member 213 are smooth structures, the rotating member 211 is sleeved on an outside of the axis of the rotating mating member 213, and the rotating member 211 may rotate relative to the rotating mating member 213. An outer surface of the annular structure is provided with a tooth structure for matching with the gear of the rotating driving member 214. In a solution, a rolling member (such as a ball or a rolling cone) is arranged between the inner surface of the annular structure of the rotating member 211 and an outer surface of the axis of the rotating mating member 213. In this way, the rotating member 211 may rotate relative to the rotating mating member 213 under a driving of the rotating driving member 214, thus driving the rotary platform 212 to rotate. In this way, the rotating member 211 may rotate relative to the inner rotating mating member 213 under the driving of the rotating driving member 214, thus driving the rotary platform 212 to rotate.

Figure 6:
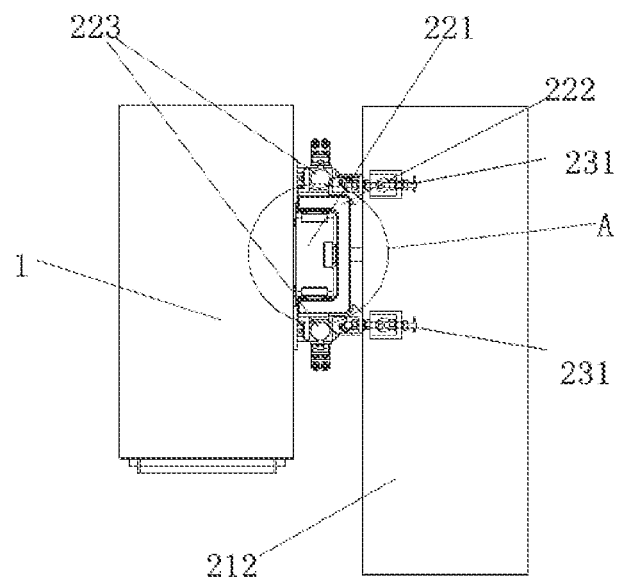
FIG. 6 shows a view of a rotary platform and an accelerator body in the present disclosure.
Figure 7:
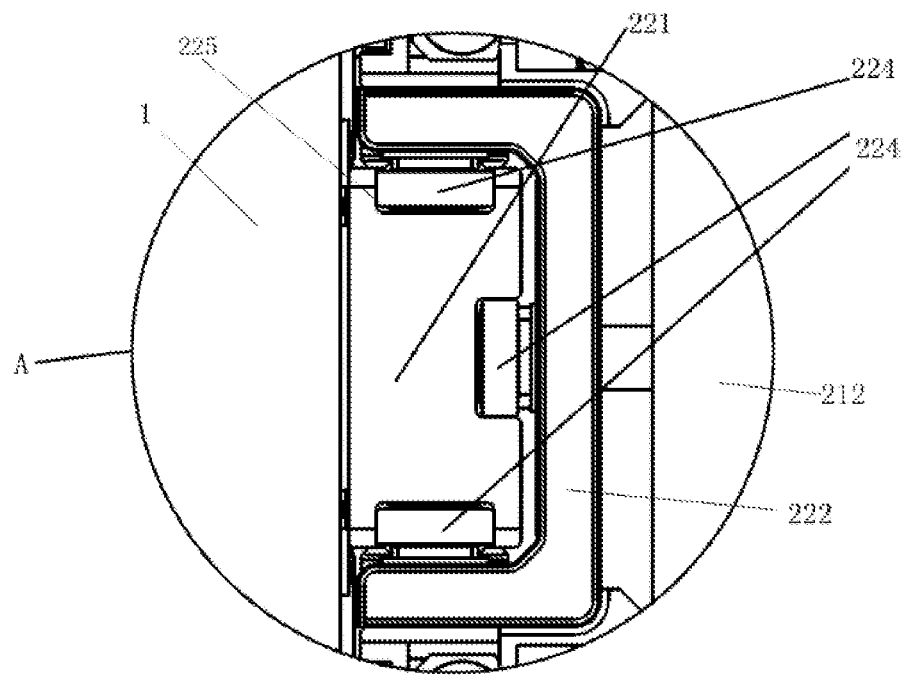
FIG. 7 shows an enlarged view of Part A in FIG. 6.

As shown in FIG. 6 to FIG. 7, in a solution, the lifting apparatus 22 includes a sliding member 221, a lifting guide rail 222 and a lifting driving apparatus 223. Under an action of the lifting driving apparatus, a relative displacement may occur between the sliding member 221 and the lifting guide rail 222.

One of the sliding member 221 and the lifting guide rail 222 is connected with the rotary platform 212, and the other one of the sliding member 221 and the lifting guide rail 222 is connected with the accelerator body 1. In this way, a relative movement of the accelerator body 1 relative to the rotary platform 212 may be achieved, so as to adjust a working position of the accelerator body 1.

In a solution, the lifting driving apparatus 223 is a structure of air cylinder, oil cylinder, gear, chain wheel, etc., which may control the accelerator body 1 to stay at any position.

Specifically, the lifting driving apparatus 223 includes a fixed end and a telescopic end that may be telescoped relative to the fixed end. The fixed end is connected with the rotary platform 212, and the telescopic end is connected with the sliding member 221.

In a solution, the lifting guide rail 222 is a U-shaped structure in cross section, and the lifting guide rail 222 includes a bottom wall, and a first sidewall and a second sidewall connected with two sides of the bottom wall. The sliding member 221 slides in a surrounding space formed by the bottom wall and the two sidewalls. In a solution, the bottom wall is connected with the rotary platform 221.

In a solution, a bearing 224 is arranged on the bottom wall and at least one first sidewall of the lifting guide rail 222, and a groove 225 for accommodating the bearing 224 is arranged on the sliding member 221. A cross section of the groove 225 is U-shaped, and two sidewalls of the groove 225 are matched with a surface of the bearing 224. The matching of the bearing 224 and the groove 225 enables the bearing 224 to move up and down in the groove 225, and limits a movement of the bearing 224 in a direction perpendicular to the lifting movement, thereby limiting a movement of the sliding member 221 in the direction perpendicular to the lifting movement (when the lifting movement is in a vertical direction, a movement in a horizontal direction is limited). In a solution, the bearings 224 are arranged on the first sidewall and the second sidewall, and correspondingly, the grooves 225 are formed on the surface of the sliding member 221 at positions corresponding to the bearings 224. In a solution, the number of the bearings on each sidewall and bottom wall may be two or more.

With such a solution, the matching of the bearing 224 and the groove 225 ensures that the sliding member 221 may move along the lifting guide rail in a straight line, and provides a reaction force to resist a force exerted by the gravity of the accelerator body 1 on a connecting point of the sliding member 221 and the lifting guide rail 222, thereby avoiding a damage of the device caused by the sliding member 221 leaving the guide rail.

In a solution, the positions of the bearing 224 and the groove 225 may be reversed, that is, the bearing 224 is arranged on the sliding member 221, and the groove 225 is formed on the lifting guide rail 223.

Figure 8:
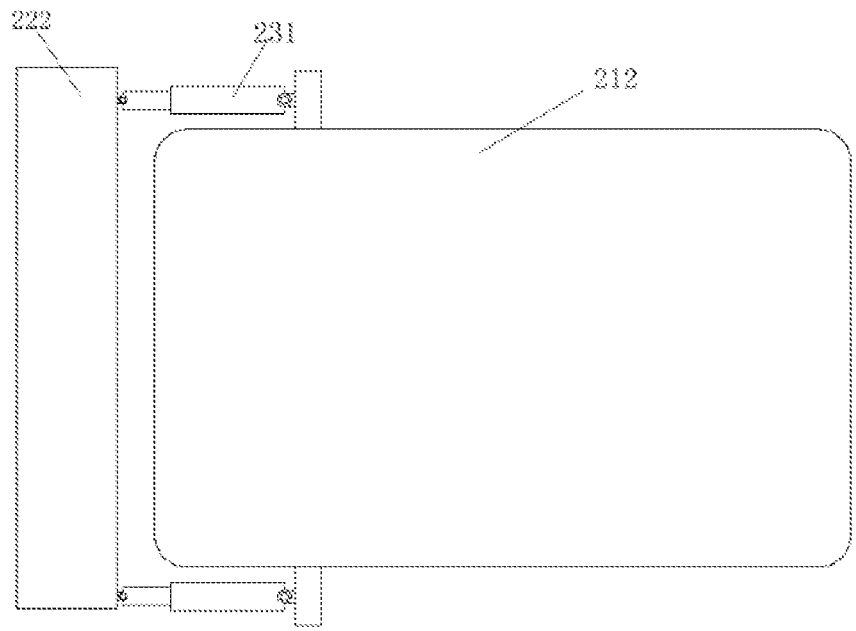
FIG. 8 shows a front view of an adjustment mechanism connected with a rotary platform and a guide rail in a solution of the present disclosure.
Figure 9:
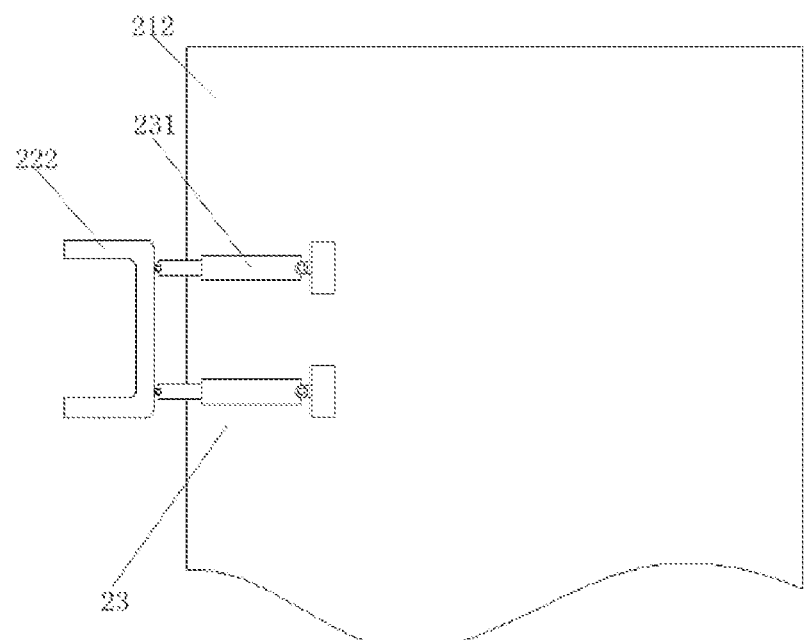
FIG. 9 shows a top view of an adjustment mechanism connected with a rotary platform and a guide rail in a solution of the present disclosure.

As shown in FIG. 7 and FIG. 8, in a solution, an adjustment mechanism 23 is further provided between the rotary platform 212 and the lifting apparatus 22, and the adjustment mechanism is used to adjust a position relationship between the lifting apparatus 22 and the rotary platform 212, including a distance, an angle, etc.

In a solution, the adjustment mechanism 23 includes three adjustment units 231, which are arranged in a triangle. Each adjustment unit 231 is a length retractable apparatus. One end of the adjustment unit 231 is connected to the rotary platform 212, and the other end of the adjustment unit 231 is connected to the lifting apparatus 22 (one of the sliding member 221 or the lifting guide rail 222). By adjusting the amount of expansion and contraction of the three adjustment units, a distance, a tilt angle or a pitch angle between the lifting apparatus 22 and the rotary platform 212 may be adjusted.

For example, when the three adjustment units 231 all extend and contract a same length, the lifting apparatus 22 is integrally translated relative to the rotary platform 212, so that the distance between the lifting apparatus 22 and the rotary platform 212 may be adjusted. In this way, a position relationship of the accelerator body 1 relative to the first edge 101 may be adjusted correspondingly during operation to avoid interference or excessive distance.

When the length of one or two adjustment units 231 is adjusted, the lifting apparatus 22 will deflect accordingly, which will cause tilting or pitching, so as to adjust an angle of the accelerator body 1 relative to the support platform 100, thereby being convenient to adapt to an actual situation of a scanned object and a detection apparatus, avoiding a ray loss, and improving a detection accuracy.

In a solution, two ends of at least one adjustment unit 231 are connected with the rotary platform 212 and the lifting apparatus 22 in a hinged mode. With such a solution, when adjusting a tilt angle or pitch angle of the accelerator body, an adjustment range is wider, and the adjustment is more flexible and reliable, so as to avoid possible interference between each other.

In a solution, the adjustment mechanism 23 includes four adjustment units 231, and the four adjustment units 231 are arranged in a rectangle. With such a solution, an angle adjustment is more convenient.

In a solution, the adjustment unit 231 is a combined structure of a bolt and a nut. In another solution, the adjustment unit 231 is a nut screw structure or an air cylinder or an oil cylinder.

The present disclosure further provides a vehicle-mounted radiation imaging device, including a vehicle and the accelerator, wherein the accelerator body 1 is connected with the vehicle through the lifting apparatus 22 and the rotating apparatus 21.

In a solution, when the rotary platform 212 is at the second position, a support apparatus is arranged below the rotary platform 212 to support the rotary platform at a position other than the rotating member 211, so as to share a force borne by the rotating member 211. The surfaces of the support apparatus and the rotary platform 212 in contact are all smooth structures. In another solution, a rolling member is arranged between the support apparatus and the rotary platform 212. In another solution, when the rotary platform 212 is located at the first position, a support apparatus is also arranged below the rotary platform 212.

Embodiment 1

An accelerator of Embodiment 1 of the present disclosure is provided on a vehicle 100. The accelerator includes the accelerator of the present disclosure, including an accelerator body 1 and a position adjusting apparatus 2.

The position adjusting apparatus 2 includes a rotating apparatus 21, a lifting apparatus 22, and an adjustment mechanism 23 arranged between the rotating apparatus 21 and the lifting apparatus 22.

The rotating apparatus 21 includes a rotating member 211, a rotary platform 212 connected with the rotating member 211, a rotating mating member 213, and a rotating driving apparatus 214. Under an action of the rotating driving apparatus 214, the rotary platform 212 may rotate together with the rotating member 211 relative to the rotating mating member 213. The rotating driving member 214 is a motor and a matched reducer and gear.

The rotating mating member 213 is arranged on the vehicle 100, and the rotating mating member 213 has an accommodating space. The rotating member 211 is an annular structure, and the rotating member 211 may be disposed in the accommodating space of the rotating mating member 213. An inner surface of the annular structure of the rotating member 211 is provided with teeth for matching with the gear of the rotating driving member 214. An outer surface of the annular structure of the rotating member 211 and an inner surface of the accommodating space of the rotating mating member 213 are both smooth structures, so that the outer surface of the annular structure of the rotating member 211 and the inner surface of the accommodating space of the rotating mating member 213 may rotate and slide relative to each other.

The lifting apparatus includes a sliding member 221, a lifting guide rail 222 and a lifting driving apparatus 223. A relative displacement may occur between the sliding member 221 and the lifting guide rail 222 under an action of the lifting driving apparatus. The sliding member 221 is fixedly connected with the accelerator body 1, and the lifting guide rail 222 is connected with the rotary platform 212 through the adjustment mechanism 23.

The lifting guide rail 222 is a U-shaped structure in cross section, including a bottom wall, and a first sidewall and a second sidewall connected with two sides of the bottom wall. The sliding member 221 may slide in a surrounding space formed by the bottom wall and two sidewalls.

Bearings 224 are respectively arranged on the bottom wall, the first sidewall and the second sidewall of the lifting guide rail 222, and grooves 225 for accommodating the bearings 224 are arranged on the sliding member 221. The cross section of the groove 225 is U-shaped, and the two sidewalls of the groove 225 are matched with the surface of the bearing 224. The matching of the bearing 224 and the groove 225 enables the bearing 224 to move up and down in groove 225, and limits a movement of the bearing 224 in a direction perpendicular to the lifting movement, thereby limiting a movement of the sliding member 221 in the direction perpendicular to the lifting movement.

The adjustment mechanism 23 includes four adjustment units, each adjustment unit is a length retractable apparatus, with one end hinged on the rotary platform 212 and the other end hinged on the lifting guide rail 222. A distance, a tilt angle or a pitch angle between the lifting apparatus 22 and the rotary platform 212 may be adjusted by adjusting the amount of expansion and contraction of the four adjustment units.

The following describes a working process of the solution of Embodiment 1 of the present disclosure in combination with the accompanying drawings.

As shown in FIG. 1 to FIG. 3, in a non-working state (such as in a transportation state), the rotary platform 212 is located at the first position, and the accelerator body 1 is on the vehicle.

Figure 10:
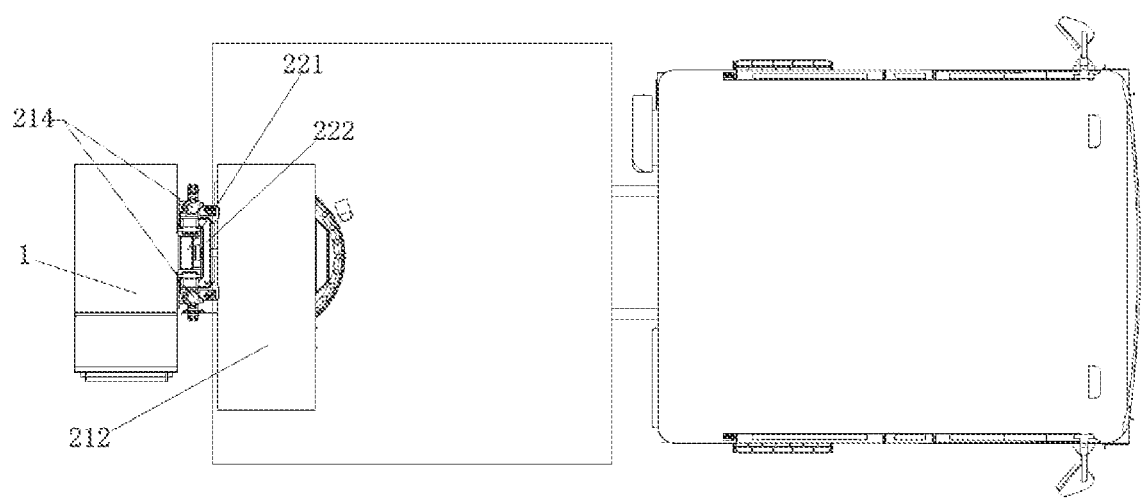
FIG. 10 shows a top view of a transition state of an accelerator in the present disclosure.
Figure 11:
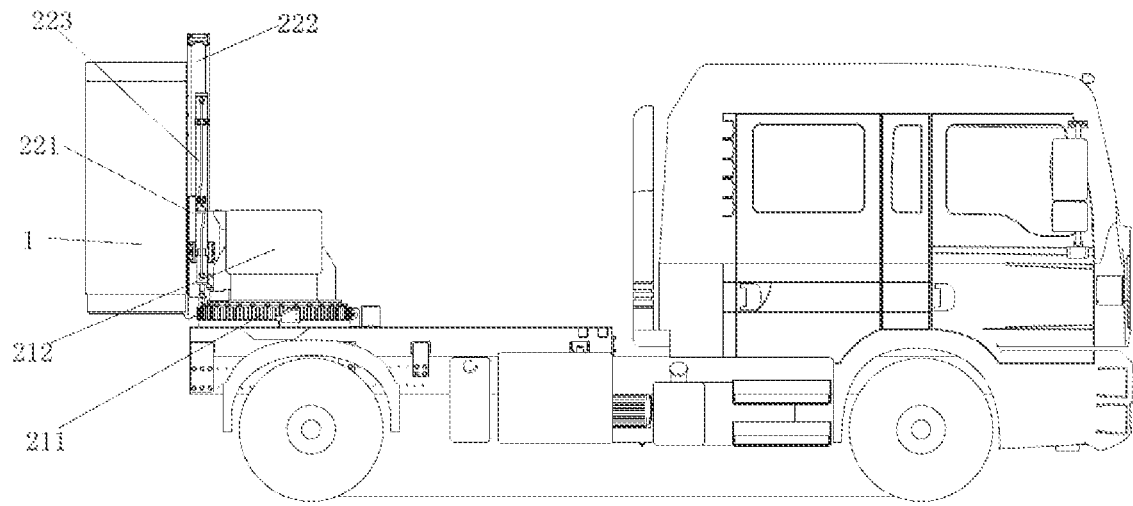
FIG. 11 shows a front view of a transition state of an accelerator in the present disclosure.
Figure 12:
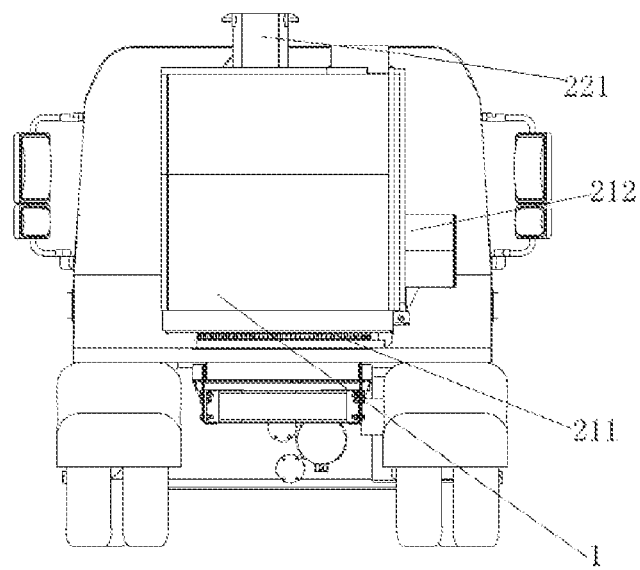
FIG. 12 shows a side view of a transition state of an accelerator in the present disclosure.

When it is desired to adjust the accelerator to the working state, the rotating driving apparatus 214 works to cause the rotating member 212 to rotate relative to the rotating mating member 213, thus driving the rotary platform 212 to rotate a certain angle (for example, 90 degrees) to reach the second position. At this point, the rotary platform 212 is located within a first edge 101 of the vehicle, and the accelerator body 1 is then rotated to be located outside the first edge 101 of the vehicle, as shown in FIG. 10 to FIG. 12.

Figure 13:
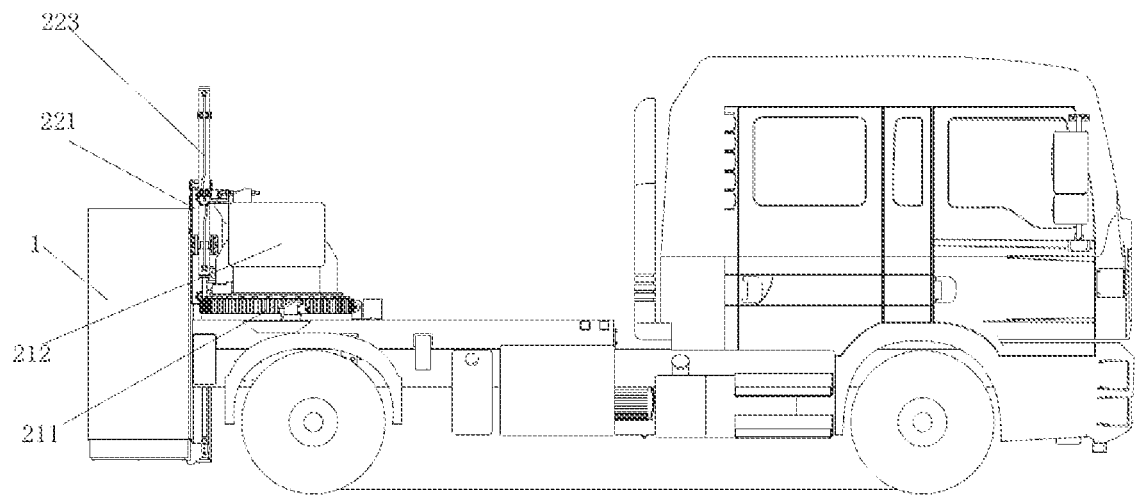
FIG. 13 shows a front view of an accelerator in a working state in the present disclosure.
Figure 14:
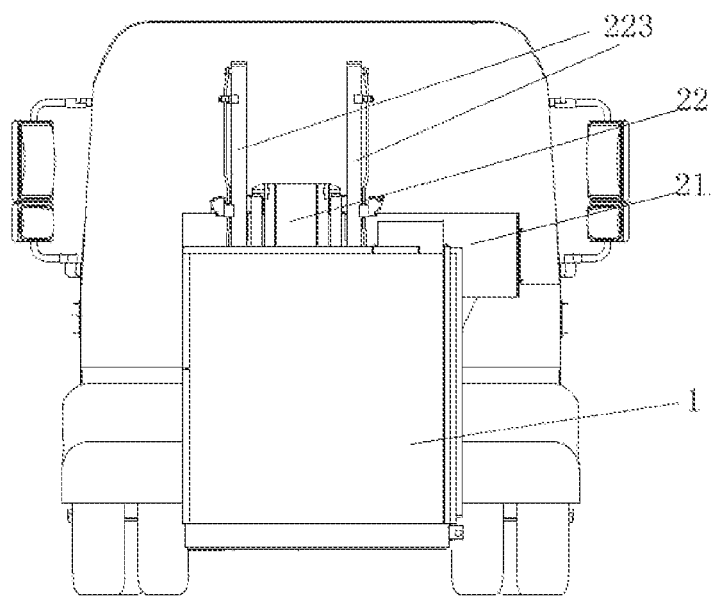
FIG. 14 shows a side view of an accelerator in a working state in the present disclosure.

The lifting driving apparatus 223 starts to act, causing the sliding member 221 to move relative to the guide rail 222, driving the accelerator body 1 to move downward and gradually reach the working position, as shown in FIG. 13 to FIG. 14.

When it is desired to adjust the distance and/or tilt angle of the accelerator body 1 relative to the rotary platform 212, at least one of the adjustment units 231 is controlled according to the situation, so that the guide rail 222 acts to drive the accelerator body 1 to a desired position.

When the work is completed and the accelerator body 1 needs to be adjusted from the working state to the non-working state, first, the lifting driving apparatus 223 starts to act, so that the sliding member 221 moves relative to the guide rail 222, driving the accelerator body 1 to move up, so that a bottom surface of the accelerator body 1 reaches above the vehicle.

Then, the rotating driving apparatus 214 operates to cause the rotating member 212 to rotate relative to the rotating driving member 213, thereby driving the rotary platform 212 to rotate a certain angle (for example, 90 degrees) to reach the first position.

The above description is only a preferred embodiment of the present disclosure and an explanation of the applied technical principles. Those skilled in the art should understand that the disclosure scope involved in the present disclosure is not limited to the technical solutions formed by the specific combination of the technical features described above, but also should cover other technical solutions formed by any combination of the technical features described above or their equivalent features without departing from the above-mentioned disclosure concept, such as technical solutions formed by replacing the features described above with the technical features with similar functions (but not limited to) disclosed in the present disclosure.

What is claimed is:

1. An accelerator, comprising an accelerator body and a position adjusting apparatus, wherein the position adjusting apparatus comprises a rotating apparatus and a lifting apparatus disposed on the rotating apparatus, the rotating apparatus is rotatably disposed on a support platform, the rotating apparatus comprises a rotary platform, the lifting apparatus is connected with the rotary platform and is rotatable with the rotary platform, and the accelerator body is connected with the lifting apparatus, wherein the rotary platform is rotatable between a first position and a second position, and when the rotary platform is at the second position, a projection of the accelerator body on a surface of the support platform is located outside a first edge of the support platform, and a projection of the rotary platform on the surface of the support platform is located within the first edge of the support platform;

wherein an adjustment mechanism is further disposed between the rotary platform and the lifting apparatus, the adjustment mechanism comprises at least three adjustment units, and each adjustment unit is a length retractable apparatus, wherein two ends of at least one adjustment unit are connected with the rotary platform and the lifting apparatus in a hinged mode.

2. The accelerator according to claim 1, wherein the rotating apparatus further comprises a rotating member, a rotating mating member and a rotating driving apparatus, and the rotating member is rotatable relative to the rotating mating member under a driving of the rotating driving apparatus.

3. The accelerator according to claim 2, wherein the rotating member is an annular structure, the rotating mating member has an accommodating space, the rotating member is disposed in the accommodating space of the rotating mating member, and the rotating member is rotatable relative to the rotating mating member.

4. The accelerator according to claim 2, wherein the rotating member is an annular structure, the rotating mating member has an axial structure, the rotating member is sleeved on an outside of the axial structure of the rotating mating member, and the rotating member is rotatable relative to the rotating mating member.

5. The accelerator according to claim 1, wherein the lifting apparatus comprises a sliding member, a lifting guide rail and a lifting driving apparatus, and the sliding member and the lifting guide rail are slidable relative to each other under a driving of the lifting driving apparatus, wherein one of the sliding member and the lifting guide rail is connected with the rotary platform, and the other one of the sliding member and the lifting guide rail is connected with the accelerator body.

6. The accelerator according to claim 5, wherein one of the lifting guide rail and the sliding member is provided with a bearing, and the other one of the lifting guide rail and the sliding member is provided with a groove for sliding fit with the bearing.

7. The accelerator according to claim 6, wherein the lifting guide rail is a U-shaped structure in cross section, the lifting guide rail comprises a bottom wall, and a first sidewall and a second sidewall connected with two sides of the bottom wall, and the bearing or the groove is disposed on the bottom wall and at least one sidewall.

8. A vehicle-mounted radiation imaging device, comprising a vehicle and the accelerator according to claim 1, wherein the vehicle is configured as the support platform.

9. The accelerator according to claim 2, wherein the lifting apparatus comprises a sliding member, a lifting guide rail and a lifting driving apparatus, and the sliding member and the lifting guide rail are slidable relative to each other under a driving of the lifting driving apparatus, wherein one of the sliding member and the lifting guide rail is connected with the rotary platform, and the other one of the sliding member and the lifting guide rail is connected with the accelerator body.

10. The accelerator according to claim 3, wherein the lifting apparatus comprises a sliding member, a lifting guide rail and a lifting driving apparatus, and the sliding member and the lifting guide rail are slidable relative to each other under a driving of the lifting driving apparatus, wherein one of the sliding member and the lifting guide rail is connected with the rotary platform, and the other one of the sliding member and the lifting guide rail is connected with the accelerator body.

11. The accelerator according to claim 4, wherein the lifting apparatus comprises a sliding member, a lifting guide rail and a lifting driving apparatus, and the sliding member and the lifting guide rail are slidable relative to each other under a driving of the lifting driving apparatus, wherein one of the sliding member and the lifting guide rail is connected with the rotary platform, and the other one of the sliding member and the lifting guide rail is connected with the accelerator body.

* * * * *